United States Patent
Qu et al.

(10) Patent No.: US 11,526,227 B2
(45) Date of Patent: Dec. 13, 2022

(54) FOLDABLE TERMINAL APPARATUS, TERMINAL CONTROL METHOD, TERMINAL APPARATUS, AND NON-TRANSITORY COMPUTER-READABLE STORAGE MEDIUM

(71) Applicant: ZTE Corporation, Shenzhen (CN)

(72) Inventors: Zhongkui Qu, Shenzhen (CN); Wenjun Han, Shenzhen (CN); Xiangjun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 3 days.

(21) Appl. No.: 17/285,075

(22) PCT Filed: Oct. 15, 2019

(86) PCT No.: PCT/CN2019/111246
§ 371 (c)(1),
(2) Date: Apr. 13, 2021

(87) PCT Pub. No.: WO2020/078351
PCT Pub. Date: Apr. 23, 2020

(65) Prior Publication Data
US 2021/0349567 A1     Nov. 11, 2021

(30) Foreign Application Priority Data
Oct. 16, 2018   (CN) .................. 201811204286.X (51) Int. Cl.
*G06F 3/041* (2006.01)
*G06F 3/14* (2006.01)
*H04M 1/02* (2006.01)

(52) U.S. Cl.
CPC ............. *G06F 3/0416* (2013.01); *G06F 3/14* (2013.01); *H04M 1/0214* (2013.01); *H04M 1/0268* (2013.01); *G06F 2203/04102* (2013.01)

(58) Field of Classification Search
CPC ... G06F 3/14; G06F 2203/04102; G09F 9/301
See application file for complete search history.

(56) References Cited

U.S. PATENT DOCUMENTS

| 2010/0117975 A1* | 5/2010 | Cho .................. G06F 3/0202 345/173 |
| 2015/0146387 A1* | 5/2015 | Lee .................. G06F 1/1652 361/749 |

(Continued)

FOREIGN PATENT DOCUMENTS

| CN | 206212072 U | 5/2017 |
| CN | 107403590 A | 11/2017 |

(Continued)

OTHER PUBLICATIONS

European Patent Office. Extended European Search Report for EP Application No. 19874424.5, dated Nov. 3, 2021, pp. 1-11.

(Continued)

*Primary Examiner* — Ryan A Lubit
(74) *Attorney, Agent, or Firm* — Vivacqua Crane, PLLC (57) ABSTRACT

A foldable terminal apparatus, a terminal control method, a terminal apparatus, and a non-transitory computer-readable storage medium are provided. The foldable terminal apparatus comprises a terminal body and a bendable touch screen. The bendable touch screen in a bending direction has a fixed end connected to the terminal body and a free end, and the bendable touch screen is switched between a first state and a second state. In the first state, the bendable touch screen surrounds the terminal body on an outer side of the terminal body, and in the second state, the fixed end of the bendable touch screen is located on the terminal body and (Continued)

the free end is located outside the terminal body, such that the bendable touch screen is expanded.

12 Claims, 9 Drawing Sheets

(56) References Cited

U.S. PATENT DOCUMENTS

| | | | | |
|---|---|---|---|---|
| 2016/0070303 A1* | 3/2016 | Lee | ............... | G06F 1/1652 |
| | | | | 361/679.27 |
| 2016/0299531 A1 | 10/2016 | Vertegaal | | |
| 2017/0075444 A1* | 3/2017 | Nade | ............... | G06F 3/041 |
| 2017/0205855 A1* | 7/2017 | Szeto | ............... | G06F 1/1624 |
| 2018/0081473 A1* | 3/2018 | Seo | ............... | G06F 1/3215 |
| 2021/0405710 A1* | 12/2021 | Chuang | ............... | G06F 1/3231 |

FOREIGN PATENT DOCUMENTS

| | | | |
|---|---|---|---|
| CN | 107528945 A | 12/2017 | |
| CN | 109547591 A | 3/2019 | |
| EP | 1967937 A1 | 9/2008 | |
| EP | 2403222 A1 | 1/2012 | |
| WO | 2017111837 A1 | 6/2017 | |

OTHER PUBLICATIONS

International Search Report and Written Opinion for the International Patent Application No. PCT/CN2019/111246 dated Dec. 13, 2019.

* cited by examiner

FOLDABLE TERMINAL APPARATUS, TERMINAL CONTROL METHOD, TERMINAL APPARATUS, AND NON-TRANSITORY COMPUTER-READABLE STORAGE MEDIUM

CROSS REFERENCE TO RELATED APPLICATIONS

This application is a national stage filing under 35 U.S.C. § 371 of international application number PCT/CN2019/111246, filed Oct. 15, 2019, which claims priority to Chinese patent application No. 201811204286.X filed Oct. 16, 2018. The contents of these applications are incorporated herein by reference in their entirety.

TECHNICAL FIELD

Embodiments of the present disclosure relate to, but are not limited to, the technical field of terminal apparatus, and in particular, but not limited to, a foldable terminal apparatus, a terminal control method, a terminal apparatus, and a non-transitory computer-readable storage medium.

BACKGROUND

Flexible screen technology, that is, placing rigid circuits and materials on a flexible substrate to make a display module with a bendable function, represents an important development direction for subsequent human-computer interactions, as well as a development direction for display technologies. A mobile phone with a flexible screen may have its own special control method according to its structural characteristics. In existing technologies, the mobile phone with a flexible screen is usually folded to about one-half of its original size simply by bending on both sides or once in the middle of the mobile phone. Such a mobile phone with a flexible screen reflects a low degree of performance development for the flexible screen, and the user experience is limited.

SUMMARY

In an embodiment of the present disclosure a foldable terminal apparatus is provided. The foldable terminal apparatus includes a terminal body and a bendable touch screen, and the bendable touch screen in a bending direction has a fixed end connected to the terminal body and a free end. The bendable touch screen is switched between a first state and a second state. In the first state, the bendable touch screen surrounds the terminal body on an outer side of the terminal body, and in the second state, the fixed end of the bendable touch screen is located on the terminal body and the free end is located outside the terminal body, such that the bendable touch screen is expanded.

In another embodiment of the present disclosure a terminal control method is provided, which is applicable to the foldable terminal apparatus. The terminal control method includes: acquiring a current state of a bendable touch screen of the terminal, and displaying the content to be displayed according to the state of the bendable touch screen.

In another embodiment of the present disclosure a terminal control device is provided, which is applicable to the foldable terminal apparatus. The terminal control device includes a state acquisition module configured to acquire a current state of a bendable touch screen of the terminal, and a display control module configured to display the content to be displayed according to the state of the bendable touch screen.

In another embodiment of the present disclosure a terminal apparatus is provided. The terminal apparatus includes a terminal body and a bendable touch screen. The terminal body includes a processor, a memory and a communication bus. The bendable touch screen in a bending direction has a fixed end connected to the terminal body and a free end. The bendable touch screen is switched between a first state and a second state. In the first state, the bendable touch screen surrounds the terminal body on an outer side of the terminal body, and in the second state, the fixed end of the bendable touch screen is located on the terminal body and the free end is located outside the terminal body, such that the bendable touch screen is expanded. The communication bus is configured to provide connection and communication between the processor and the memory, and the processor is configured to execute one or more computer programs stored in the memory to perform the steps of the terminal control method.

In an embodiment of the present disclosure a non-transitory computer-readable storage medium storing one or more computer programs is provided. When executed by one or more processors, the computer programs cause the one or more processors to implement the steps of the terminal control method.

DETAILED DESCRIPTION

To make the objects, technical schemes and advantages of the present disclosure clearer, the embodiments of the present disclosure are described below in detail by specific embodiments with reference to the accompanying drawings. It should be understood that the specific embodiments described herein are merely intended to explain the disclosure and are not intended to limit the disclosure. Furthermore, the drawings are schematic and are not necessarily drawn to scale, and some details in the drawings may be exaggerated or simplified to better illustrate and explain the innovative aspects of the disclosure.

First Exemplary Embodiment

Figure 1:
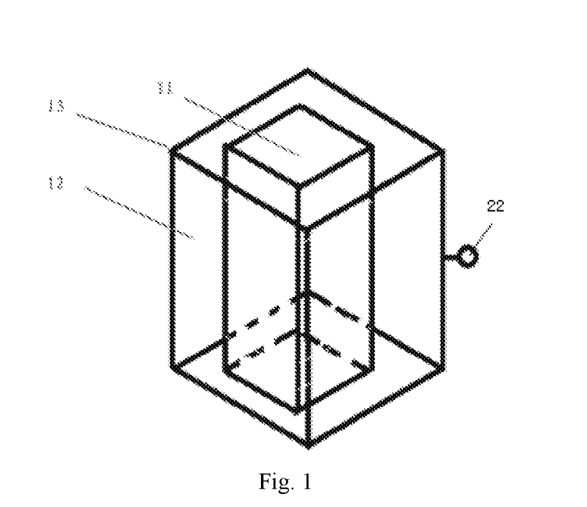
FIG. 1 is a schematic view of a foldable terminal apparatus in a first embodiment of the present disclosure.
Figure 2:
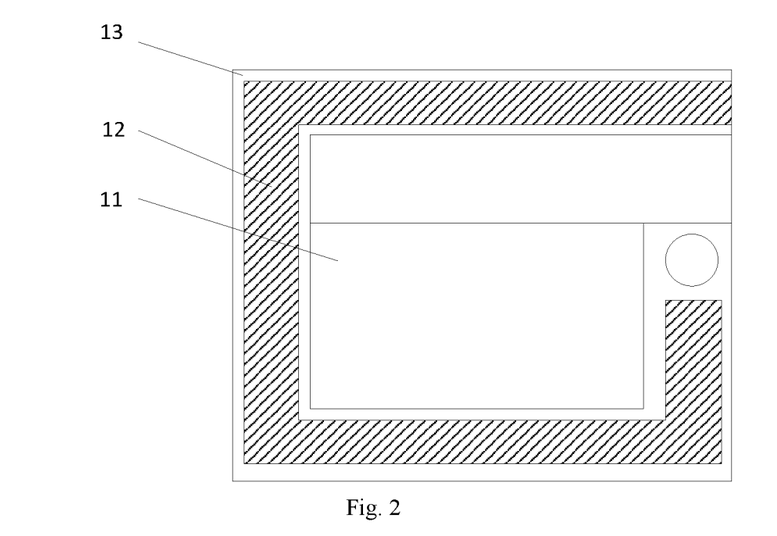
FIG. 2 is a sectional view of the foldable terminal apparatus in the first embodiment of the present disclosure.
Figure 3:
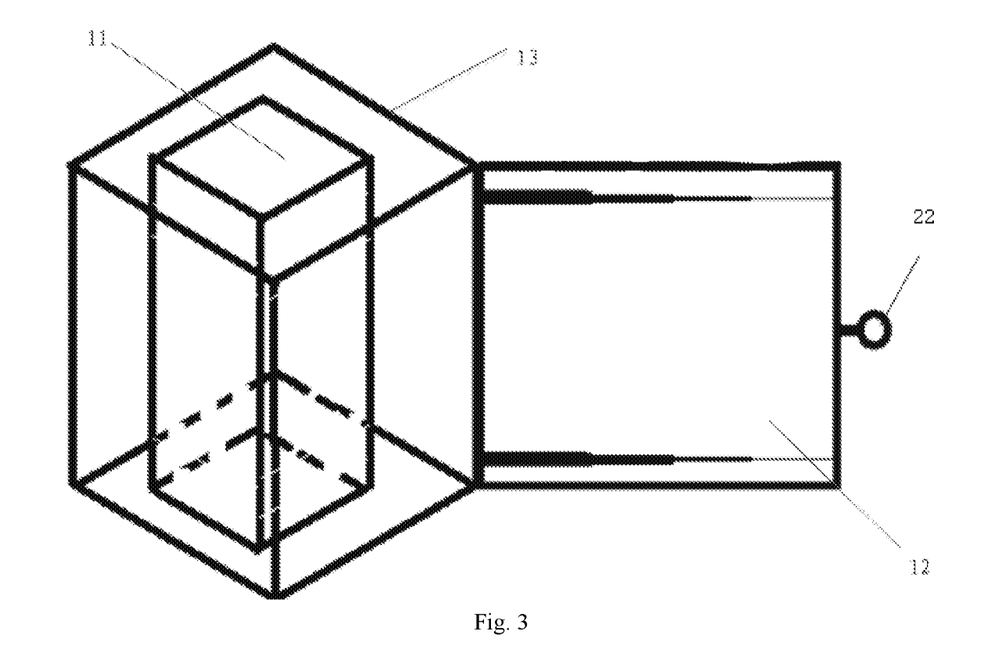
FIG. 3 is a schematic view of the foldable terminal apparatus expanded in the first embodiment of the present disclosure.

FIGS. 1 to 3 are schematic diagrams of a foldable terminal apparatus provided in this embodiment. The foldable terminal apparatus includes a terminal body 11 and a bendable touch screen 12. The bendable touch screen 12 in a bending direction has a fixed end connected to the terminal body 11 and a free end. The bendable touch screen 12 is switched between a first state and a second state: in the first state, the bendable touch screen 12 surrounds the terminal body 11 and is located on an outer side of the terminal body 11; in the second state, the fixed end of the bendable touch screen 12 is located on the terminal body 11, and the free end is located outside the terminal body 11, such that the bendable touch screen 12 is expanded.

By "foldable" in the "foldable terminal apparatus" it is meant that the bendable touch screen 12 of the terminal apparats is foldable. The bendable touch screen 12 may also be referred to as a flexible screen, which means that the screen itself can have deformation within a certain limit, which includes, but not limed to, "folded", "bent", or the like. The bendable touch screen 12 has both functions of display and touch control. The term "display" means to present a content to be displayed on the bendable touch screen 12, and the "touch control" means that a user can operate the terminal apparatus through clicking, sliding, pressing, etc. The touch control may be a contact touch control or a floating touch control at a certain distance.

Some hardware available for the terminal apparatus, such as a pressure sensor, a fingerprint recognition module and a camera may also be integrated into the bendable touch screen 12, while other hardware, such as a central processing unit, an acceleration sensor, a gyroscope and a data interface may be arranged in the terminal body 11. The fingerprint recognition module may be an optical fingerprint recognition module, an ultrasonic fingerprint recognition module, and etc. The camera may be an under-screen camera module.

Figure 4:
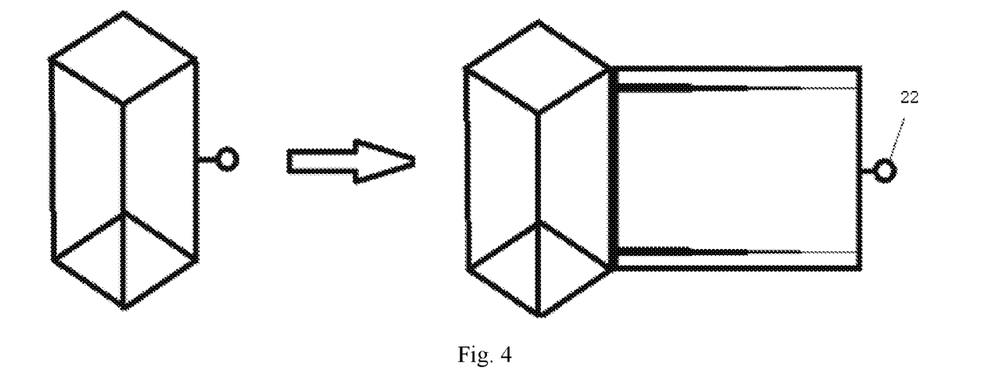
FIG. 4 is a schematic diagram illustrating state switching of the foldable terminal apparatus in the first embodiment of the present disclosure.

The bending direction of the bendable touch screen 12 refers to a direction of deformation occurring when the bendable touch screen 12 is switched between the first state and the second state, i.e., a direction in which the bendable touch screen 12 surrounds the terminal body 11 in the first state, and a direction in which the bendable touch screen 12 expands in the second state. The bending of the bendable touch screen 12 may be achieved through a manual operation by a user, e.g. on a handle 22 shown in FIG. 1, or by means of a key-press operation, etc. In some embodiments, the bending of the bendable touch screen 12 may be achieved by the terminal apparatus itself when a triggering condition is met, e.g., by receiving a user's operation on the bendable touch screen 12, or by receiving a user's voice instruction, or at a preset trigger time, or the like. In some embodiments, the bending of the bendable touch screen 12 may be initiated by an application operating in the foreground of the terminal apparatus. For example, when the application operating currently in the foreground is a video application, it is appropriate for the bendable touch screen 12 to be in the second state, i.e., expanded; and when the application operating in the foreground is a short message application, the bendable touch screen 12 may be put in the first state for display. FIG. 1 shows a perspective view of the foldable terminal apparatus in the first state. FIG. 2 shows a cross-sectional view of the foldable terminal apparatus in the first state. FIG. 3 shows a view of the foldable terminal apparatus in the second state. FIG. 4 shows a change diagram of the terminal apparatus being switched from the first state to the second state.

When the bendable touch screen 12 is in the first state, due to the viewing angle, the user usually cannot view all the content displayed in full screen of the bendable touch screen 12. In this case, the user may selectively allow only a part of the bendable touch screen 12 to display, while allowing the other parts to undergo operations such as black screen, screen-off and locking, or to just display a desktop background, etc., thereby ensuring the user's operations on the terminal apparatus, while avoiding excessive power consumption.

When the bendable touch screen 12 is in the second state, the free end extends out of the terminal body 11, such that at least part of the bendable touch screen 12 is expanded into a plane. In this case, the user can view all the expanded portion of the bendable touch screen 12. Here, the bendable touch screen 12 in the second state may have two conditions: the bendable touch screen 12 is fully expanded, and the bendable touch screen 12 is partially expanded. When fully expanded, the entire bendable touch screen 12 is expanded into a plane, so that the user can view all the content displayed on the whole bendable touch screen 12. When partially expanded, the non-expanded portion of the bendable touch screen 12 still surrounds the terminal body 11, and in this case, the content to be displayed on the bendable touch screen 12 may be displayed only on the expanded portion. In some embodiments, the content to be displayed on the bendable touch screen 12 may be displayed on both the expanded portion and the non-expanded portion (the portion surrounds the terminal body 11).

In some embodiments, the foldable terminal apparatus further includes a glass panel 13 located on the outer side of the terminal body 11. The glass panel 13 is fixedly arranged on the terminal body 11 and has a spacing from the terminal body 11 greater than or equal to a thickness of the bendable touch screen 12. The glass panel 13 serves to protect the terminal body 11 and the bendable touch screen 12. Since the bendable touch screen 12 has the feature of being switchable between the first state and the second state, the glass panel 13 arranged on the terminal body 11 can protect the bendable touch screen 12 in the first state. The bending characteristic of the bendable touch screen 12 determines that its outer protective panel needs to have sufficient strength and toughness to avoid damage during the switching between the first state and the second state. For this purpose, the transparent glass panel 13 with high strength and toughness is used to protect the bendable touch screen 12 without impairing the touch operations on the bendable touch screen 12.

In some embodiments, the glass panel 13 has a shape matching a lateral side profile of the terminal body 11. Since the glass panel 13 serves to protect the bendable touch screen 12, when the shape of the glass panel 13 matches the lateral side profile of the terminal body 11, the structural stability between the terminal body 11 and the glass panel 13 as well as the bendable touch screen 12 can be ensured, thereby avoiding uneven spacings among the glass panel 13, the terminal body 11 and the bendable touch screen 12, which may impair the display effect or the touch operations of the bendable touch screen 12.

In some embodiments, the foldable terminal apparatus further includes a supporting frame. In the first state, the supporting frame is accommodated between the outer side of the terminal body 11 and the bendable touch screen 12. In the second state, the supporting frame expands into a plane at the bottom of the bendable touch screen 12 to support the bendable touch screen 12 expanded into the plane. The supporting frame is constructed to provide support for the bendable touch screen 12 when the bendable touch screen 12 is in the second state, thereby allowing the bendable touch screen 12 to maintain its flat shape and increasing the strength of the bendable touch screen 12 in the second state. In some embodiments, the supporting frame might not be used, and instead the user may expand the bendable touch screen 12 into a plane in the second state by any suitable means, such as holding the bendable touch screen with hands, laying the bendable touch screen on a table, etc.

The supporting frame can be constructed to only play its role in the second state, that is, providing support for the bendable touch screen 12. When the bendable touch screen 12 is in the first state, the supporting frame is accommodated between the outer side of the terminal body 11 and the bendable touch screen 12. In some embodiments, the terminal body 11 may include an accommodating slot in which the supporting frame may be accommodated.

Figure 6:
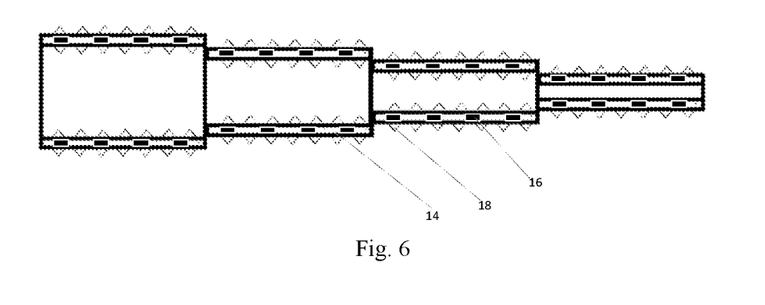
FIG. 6 is a schematic structural diagram of a telescopic supporting frame in the second embodiment of the present disclosure.

In some embodiments, the supporting frame is a telescopic supporting frame having one end fixedly connected to the terminal body 11. FIG. 6 shows a schematic structural diagram of the telescopic supporting frame. In the embodiment, the telescopic supporting frame is retracted in the first state and expanded in the second state. The telescopic supporting frame includes at least two connecting sections having radial dimensions decreasing or increasing progressively along a direction away from the terminal body 11 in the second state. Every two adjacent connecting sections have matched inner and outer diameter dimensions. The telescopic supporting frame is generally of a stepped structure, that is, the inner and outer diameters of the adjacent connecting sections of the supporting frame are matched with each other, like a structure of a fishing rod and an umbrella handle, which are generally cylindrical. In the embodiment, the telescopic supporting frame has a plane for supporting the bendable touch screen 12, thereby to ensure that the bendable touch screen 12 can be presented as a "flat screen" while expanded in the second state.

In some embodiments, the foldable terminal apparatus further includes at least two second inductive electromagnets arranged on one side of the telescopic supporting frame close to the bendable touch screen 12, and a plurality of first inductive electromagnets corresponding to the second inductive electromagnets, arranged at corresponding positions on the bottom of the bendable touch screen 12. In the second state, the first inductive electromagnets and the second inductive electromagnets magnetically stick together. In order to ensure the structural stability of the bendable touch screen 12 in the second state, the bendable touch screen 12 may be in a fixed connection to the supporting frame to achieve a close fit between the bendable touch screen 12 and the supporting frame. In some embodiment, the corresponding inductive electromagnets, i.e., the first inductive electromagnets and the second inductive electromagnets, are respectively arranged at the bottom of the bendable touch screen 12 and a top of the supporting frame. The first inductive electromagnets and the second inductive electromagnets can then be energized when the bendable touch screen 12 is in the second state. While energized, the corresponding inductive electromagnets stick together due to a magnetic effect, thus achieving the fixed connection between the telescopic supporting frame and the bendable touch screen 12. The reason for using the inductive electromagnets is to provide adjustability for the connection between the telescopic supporting frame and the bendable touch screen 12. The inductive electromagnets can be directly controlled by energizing and deenergizing, and thus provides a relatively simple operation. It is worth mentioning that, the corresponding first and second inductive electromagnets should have opposite magnetic poles between them to ensure that the two inductive electromagnets can are attracted together when energized.

In some embodiments, the foldable terminal apparatus further includes a plurality of third inductive electromagnets arranged on an outer side surface of the terminal body 11, corresponding to the first inductive electromagnets. In the first state, the first inductive electromagnets and the third inductive electromagnets are magnetically attracted together.

In addition to the fact that the flat display of the bendable touch screen 12 can be ensured by the ferromagnetism of the electromagnets in the second state, in the first state the bendable touch screen 12 and the terminal body 11 can also be presented in a matching manner by means of the cooperation of the electromagnets. For this purpose, correspondingly to the first inductive electromagnets that have already been arranged on the bendable touch screen 12, the third inductive electromagnets can be arranged on the terminal body 11. In the first state, the first inductive electromagnets and the third inductive electromagnets are energized, such that the first inductive electromagnets and the third inductive electromagnets are magnetically attracted together to ensure the structural stability of the bendable touch screen 12 in the first state, and at this time the second inductive electromagnets are not energized. In the second state, the first inductive electromagnets and the second inductive electromagnets are energized, such that the first inductive electromagnets and the second inductive electromagnets are magnetically attracted together to ensure that the bendable touch screen 12 is expanded to form a flat screen, and at this time the third inductive electromagnets are not energized.

In order to ensure the efficiency and accuracy of the retraction of the bendable touch screen 12, the terminal body 11 may be provided with retraction slots corresponding to the first inductive electromagnets arranged on the bottom of the bendable touch screen. Each of the retraction slot has a buckle structure for the first inductive electromagnets, and the third inductive electromagnets are arranged at bottoms of the retraction slots. During the retraction process, the retraction slots allow the corresponding first inductive electromagnets to slide and prevents the bendable touch screen 12 from falling off. During or after the retraction process, the first inductive electromagnets and the third inductive electromagnets are energized, and the magnetic attraction is generated between the first inductive electromagnets and the third inductive electromagnets, such that the bendable touch screen 12 can be attached to the terminal body 11.

In some embodiments, the foldable terminal apparatus further includes inner and outer sliding gear sets matched with each other. The inner and outer sliding gear sets are arranged between every two adjacent connecting sections of the telescopic supporting frame. The inner and outer sliding gear sets refers to, for example, two sliding gear sets matched with each other, one of which is arranged on an inner side of the large-sized connecting section, and the other one is arranged on an outer side of the small-sized connecting section, in a nesting structure consisting of the adjacent connecting sections. The sliding gear sets may be used as a power source for the expansion and retraction of the telescopic supporting frame, that is, the sliding gear sets can be driven by electric power. When an action is triggered, the sliding gear sets may perform a corresponding sliding operation to move the connecting sections of the telescopic supporting frame. The sliding gear sets can also make the sliding of the connecting sections smoother and improve the connection stability of the connecting sections of the telescopic supporting frame.

Figure 9:
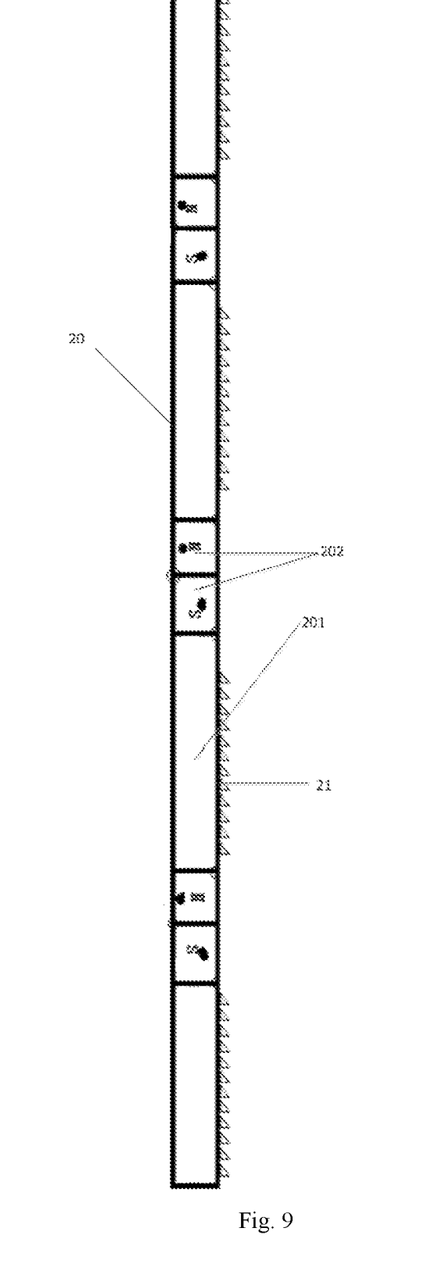
FIG. 9 is a schematic structural diagram of a foldable supporting frame in the third embodiment of the present disclosure.

In some embodiments, the supporting frame is foldable and includes at least two folding portions and connecting portions connecting the folding portions adjacent. The folding portions are arranged at the bottom of the bendable touch screen 12 and fixedly connected to the bendable touch screen 12. The connecting portion is in a rotatable connection to the adjacent folding portions. FIG. 9 shows a schematic structural diagram of a foldable supporting frame. In addition to the telescopic supporting frame, the foldable support frame can be used as the supporting frame. A common feature between the foldable supporting frame and the telescopic supporting frame lies in that both the foldable supporting frame and the telescopic supporting frame are in a retracted state in the first state and are in an expanded state in the second state. However, the foldable supporting frame differs from the telescopic supporting frame that the foldable supporting frame is retracted and expanded in a folded form. The foldable supporting frame includes at least two folding portions and connecting portions. The connecting portion is arranged between the two adjacent folding portions and is used to connect the folding portions. The folding portions are directly arranged at the bottom of the bendable touch screen 12 and drive the bendable touch screen 12 to switch between the first state and the second state. The folding portions are arranged at the bottom of the bendable touch screen 12, for example, are fixedly connected to the bottom of the bendable touch screen 12.

The folding portions are in rotatable connection to the connecting portion, such that the folding portions and the connecting portion can be foldable in the process of switching between the first state and the second state, that is, the foldable supporting frame can be foldable. In one embodiment, the rotatable connection is a hinge connection.

In some embodiments, the connecting portion includes at least two electromagnets which are connected by a hinge, and the adjacent surfaces of the electromagnets are different in polarity (different magnetic properties) while the electromagnets are energized. In the second state, the electromagnets are energized and attracted together to keep the folding portions of the foldable supporting frame expanded into a plane. The connecting portion are consisted of the electromagnets connected by a hinge, which is characterized by being electromagnetic when energized and non-magnetic when not energized. In other words, when the electromagnets are energized, the adjacent electromagnets stick together since their adjacent surfaces are different in polarity. Therefore, the connecting portion which is foldable previous by the hinge connection is turned into a whole, and consequently the connecting portion cooperates with the folding portions to present the expanded bendable touch screen 12 as a plane.

In some embodiments, the connecting portion includes at least one electromagnet and at least one ferromagnetic object which are connected by a hinge. In the second state, the electromagnet is energized and thus attracts the ferromagnetic object together to keep the folding portions of the foldable supporting frame expanded into a plane. Similar to the connecting portion consisted of at least two electromagnets, the connecting portion consisted of the at least one electromagnet and the at least one ferromagnetic object can be used. The energized electromagnet has ferromagnetism to attract the adjacent ferromagnetic object and thus turns the connecting portion into a whole, and the connecting portion cooperates with the folding portions present the expanded bendable touch screen 12 as a plane.

In some embodiments, transmission gear sets are respectively arranged at the bottom of the foldable supporting frame, and at a position on the terminal body corresponding to the bottom of the foldable support frame in the first state.

In some embodiments, the terminal body 11 is substantially or approximately shaped as a cuboid or cylinder. In some embodiments, the cuboid may be a rectangular cuboid having two square side surfaces and several identical rectangle side surfaces, and the bendable touch screen 12 surrounds the side surfaces except for the two square side surfaces. The bendable touch screen 12 in the first state can perform the display on one, some or all of the four side surfaces of the terminal body 11 separately or synchronously. When the terminal body 11 is shaped as a cylinder, the bendable touch screen 12 surrounds the lateral side surface of the cylinder. Similarly, the bendable touch screen 12 in the first state can perform the display on different areas of the cylindrical side surface of the terminal body 11 separately or synchronously, or perform the display on the entire lateral side surface of the cylinder.

In some embodiments, the foldable terminal apparatus is a portable terminal apparatus such as a mobile phone. In some embodiments, the foldable terminal apparatus is a device with a display function, such as a computing device, a video playback device, or a game device.

In the embodiment of the present disclosure is provided a foldable terminal apparatus, including a terminal body and a bendable touch screen. The bendable touch screen in a bending direction has a fixed end connected to the terminal body and a free end. In a first state, the bendable touch screen surrounds the terminal body on an outer side of the terminal body; and in a second state, the fixed end of the bendable touch screen is located on the terminal body, and the free end is located outside the terminal body, such that the bendable touch screen is expanded. In the embodiment of the present disclosure a brand-new foldable terminal apparatus is provided, of which the bendable touch screen can be foldable in two states. The flexible touch screen is sufficiently utilized for better user experience by designing the flexible touch screen to surround the terminal body in the first state and to expand in the second state by means of the bending property the flexible touch screen.

Second Exemplary Embodiment

Figure 5:
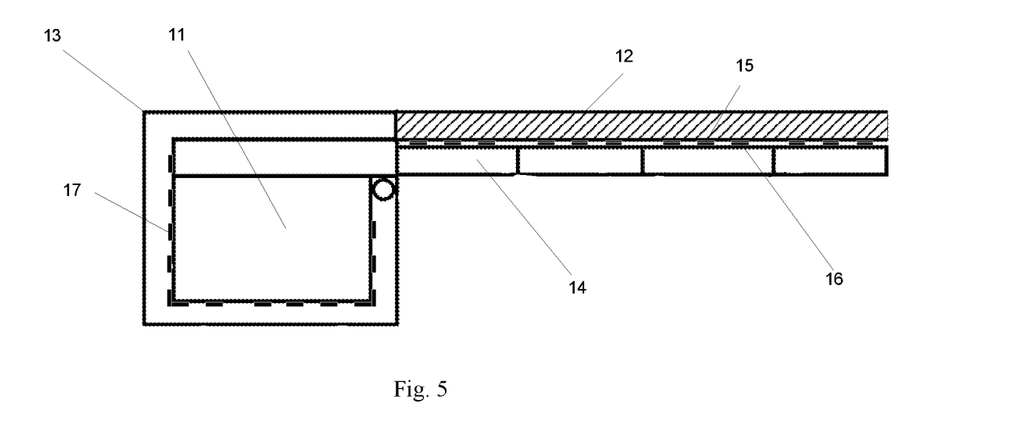
FIG. 5 is a schematic structural diagram of a foldable terminal apparatus in a second embodiment of the present disclosure.
Figure 8:
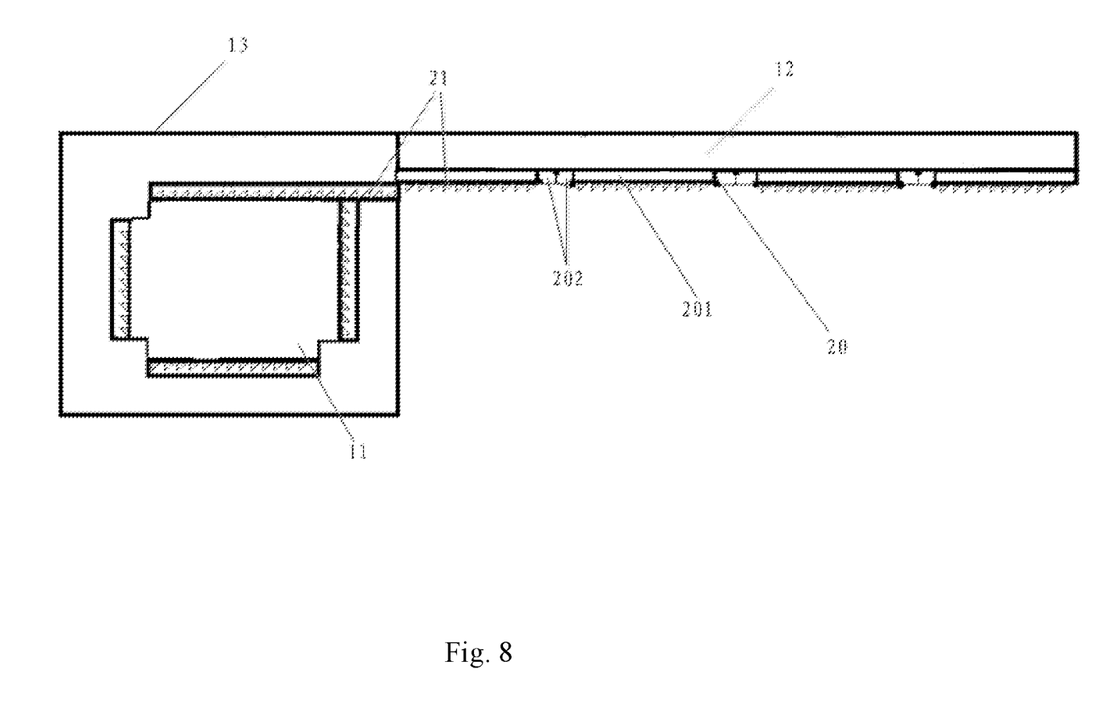
FIG. 8 is a schematic structural diagram of a foldable terminal apparatus in a third embodiment of the present disclosure.

FIG. 5 is a schematic diagram of an expanded structure of a bendable touch screen 12 in a foldable terminal apparatus provided by this embodiment. In this embodiment, as shown in FIG. 8, the foldable terminal apparatus includes a terminal body 11 and a bendable touch screen 12. The bendable touch screen 12 in a bending direction has a fixed end connected to the terminal body 11 and a free end. In a first state, the bendable touch screen 12 surrounds the terminal body 11 on an outer side of the terminal body 11; and in a second state, the fixed end of the bendable touch screen 12 is located on the terminal body 11, and the free end is located outside the terminal body 11, such that the bendable touch screen 12 is expanded.

The foldable terminal apparatus in the embodiment further includes a telescopic supporting frame 14. In the first state, the telescopic supporting frame 14 is accommodated between the outer side of the terminal body 11 and the bendable touch screen 12; and in the second state, the telescopic supporting frame 14 expands into a plane at the bottom of the bendable touch screen 12 to support the bendable touch screen 12 expanded into a plane, shown in FIG. 6, which shows a schematic structural diagram of the telescopic supporting frame in this embodiment.

In the embodiment, the telescopic supporting frame 14 has one end fixedly connected to the terminal body 11. The telescopic supporting frame 14 has a telescopic structure, that is, in the first state, the supporting frame is retracted, and in the second state, the supporting frame is expanded.

In some embodiments, the telescopic supporting frame 14 includes at least two connecting sections having radial (i.e., a vertical direction in FIG. 6) dimensions decreasing or increasing progressively along a direction away from the terminal body 11 in the second state. Every two adjacent connecting sections have matched inner and outer diameter dimensions. The telescopic supporting frame is generally of a stepped structure, that is, the inner and outer diameters of the adjacent connecting sections of the supporting frame are matched with each other, like a structure of a fishing rod and an umbrella handle, which are generally cylindrical. In the embodiment, the telescopic supporting frame has a plane for supporting the bendable touch screen 12, thereby to ensure that the bendable touch screen 12 can be presented as a "flat screen" while expanded in the second state.

In some embodiments, the foldable terminal apparatus further includes at least two second inductive electromagnets 16 arranged on one side of the telescopic supporting frame close to the bendable touch screen 12, and a plurality of first inductive electromagnets 15 corresponding to the second inductive electromagnets 16, arranged at corresponding positions on the bottom of the bendable touch screen 12. In the second state, the first inductive electromagnets 15 and the second inductive electromagnets 16 magnetically stick together. In order to ensure the structural stability of the bendable touch screen 12 in the second state, the bendable touch screen 12 may be in a fixed connection to the telescopic supporting frame 14 to achieve a close fit between the bendable touch screen 12 and the telescopic supporting frame 14. In some embodiment, the corresponding inductive electromagnets, i.e., the first inductive electromagnets 15 and the second inductive electromagnets 16, are respectively arranged at the bottom of the bendable touch screen 12 and a top of the telescopic supporting frame 14. The first inductive electromagnets 15 and the second inductive electromagnets 16 can then be energized when the bendable touch screen 12 is in the second state. While energized, the corresponding inductive electromagnets stick together due to a magnetic effect, thus achieving the fixed connection between the telescopic supporting frame 14 and the bendable touch screen 12. The reason for using the inductive electromagnets is to provide adjustability for the connection between the telescopic supporting frame 14 and the bendable touch screen 12. The inductive electromagnets can be directly controlled by energizing and deenergizing, and thus provides a relatively simple operation. It is worth mentioning that, the corresponding first inductive electromagnets 15 and the second inductive electromagnets 16 should have opposite magnetic poles between them to ensure that the two inductive electromagnets can are attracted together when energized.

In some embodiments, the foldable terminal apparatus further includes a plurality of third inductive electromagnets 17 arranged on an outer side surface of the terminal body 11, corresponding to the first inductive electromagnets 15. In the first state, the first inductive electromagnets 15 and the third inductive electromagnets 17 are magnetically attracted together.

In addition to the fact that the flat display of the bendable touch screen 12 can be ensured by the ferromagnetism of the electromagnets in the second state, in the first state the bendable touch screen 12 and the terminal body 11 can also be presented in a matching manner by means of the cooperation of the electromagnets. For this purpose, correspondingly to the first inductive electromagnets 15 that have already been arranged on the bendable touch screen 12, the third inductive electromagnets 17 can be arranged on the terminal body 11. In the first state, the first inductive electromagnets 15 and the third inductive electromagnets 17 are energized, such that the first inductive electromagnets 15 and the third inductive electromagnets 17 are magnetically attracted together to ensure the structural stability of the bendable touch screen 12 in the first state, and at this time the second inductive electromagnets 16 are not energized. In the second state, the first inductive electromagnets 15 and the second inductive electromagnets 16 are energized, such that the first inductive electromagnets 15 and the second inductive electromagnets 16 are magnetically attracted together to ensure that the bendable touch screen 12 is expanded to form a flat screen, and at this time the third inductive electromagnets 17 are not energized.

Figure 7:
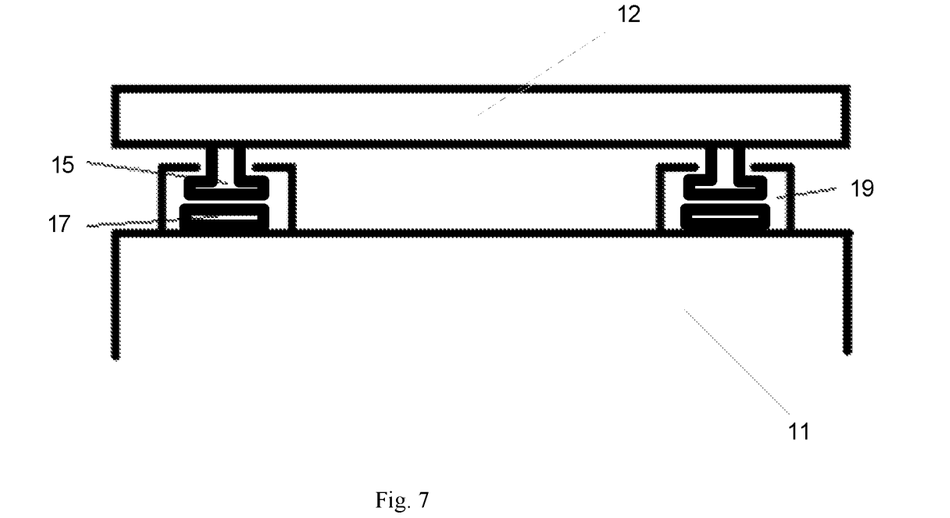
FIG. 7 is a schematic diagram of a retraction slot in the second embodiment of the present disclosure.

In order to ensure the efficiency and accuracy of the retraction of the bendable touch screen 12, the terminal body 11 may be provided with retraction slots 19 corresponding to the first inductive electromagnets 15 arranged on the bottom of the bendable touch screen 12. Each of the retraction slots 19 has a buckle structure for the first inductive electromagnets 15, and the third inductive electromagnets 17 are arranged at bottoms of the retraction slots 19. During the retraction process, the retraction slots 19 allow the first inductive electromagnets 15 to slide and prevents the bendable touch screen 12 from falling off. During or after the retraction process, the first inductive electromagnets 15 and the third inductive electromagnets 17 are energized, and the magnetic attraction is generated between the first inductive electromagnets 15 and the third inductive electromagnets 17, such that the bendable touch screen 12 can be attached to the terminal body 11. FIG. 7 is a schematic structural diagram of the retraction slots 19.

In some embodiments, as shown in FIG. 6, the foldable terminal apparatus further includes inner and outer sliding gear sets 18 matched with each other. The inner and outer sliding gear sets 18 are arranged between every two adjacent connecting sections of the telescopic supporting frame 14. The inner and outer sliding gear sets 18 refers to, for example, two sliding gear sets matched with each other, one of which is arranged on an inner side of the large-sized connecting section, and the other one is arranged on an outer side of the small-sized connecting section, in a nesting structure consisting of the adjacent connecting sections. The sliding gear sets may be used as a power source for the expansion and retraction of the telescopic supporting frame 14, that is, the sliding gear sets can be driven by electric power. When an action is triggered, the sliding gear sets may perform a corresponding sliding operation to move the connecting sections of the telescopic supporting frame 14. The sliding gear sets can also make the sliding of the connecting sections smoother and improve the connection stability of the connecting sections of the telescopic supporting frame 14.

Third Exemplary Embodiment

FIG. 8 is a schematic structural diagram of a foldable terminal apparatus provided by this embodiment. In the embodiment, the foldable terminal apparatus includes a terminal body 11 and a bendable touch screen 12. The bendable touch screen 12 in a bending direction has a fixed end connected to the terminal body and a free end. In a first state, the bendable touch screen 12 surrounds the terminal body 11 on an outer side of the terminal body 11; and in a second state, the fixed end of the bendable touch screen 12 is located on the terminal body 11, and the free end is located outside the terminal body 11, such that the bendable touch screen 12 is expanded.

Figures 10, 11:
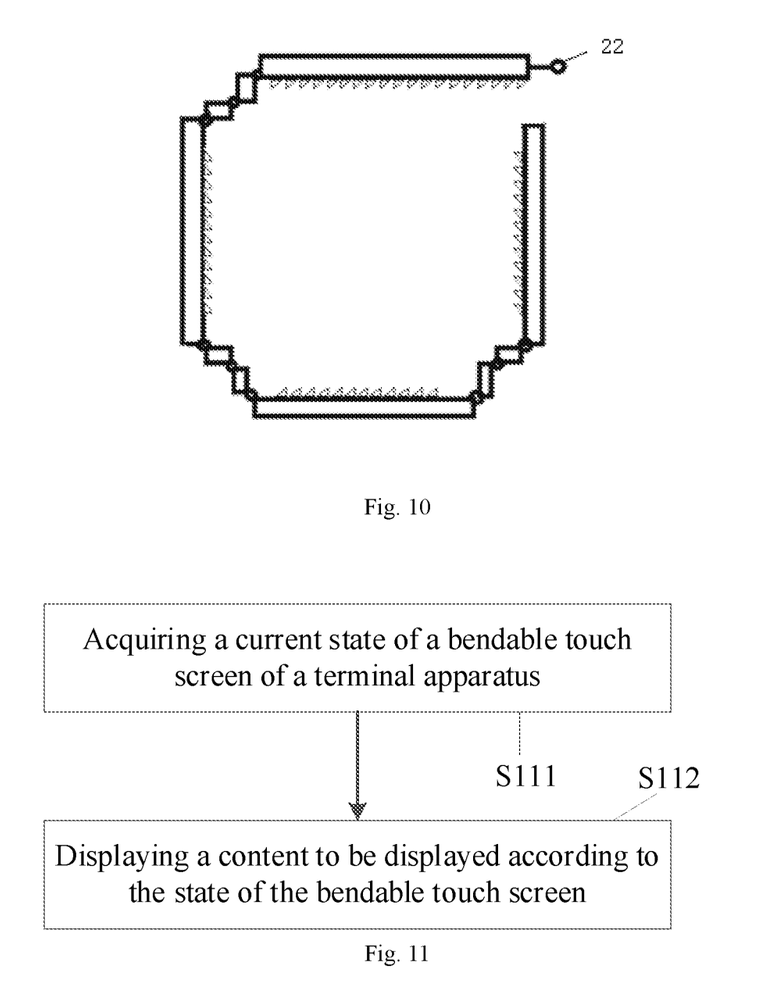
FIG. 10 is a schematic structural diagram of the foldable supporting frame in a first state in the third embodiment of the present disclosure.
FIG. 11 is a flowchart of a terminal control method in a fourth embodiment of the present disclosure.

The foldable terminal apparatus of the embodiment further includes a foldable supporting frame 20. In the first state, the foldable supporting frame 20 is accommodated between the outer side of the terminal body 11 and the bendable touch screen 12, and in the second state, the foldable supporting frame 20 expands into a plane at the bottom of the bendable touch screen 12 to support the bendable touch screen 12 expanded into a plane. Please refer to FIGS. 9 and 10, where FIG. 9 is a schematic structural diagram of the foldable supporting frame 20 in this embodiment in the second state, and FIG. 10 is a schematic structural diagram of the foldable supporting frame 20 in the first state.

The foldable supporting frame 20 includes at least two folding portions 201 and one connecting portion 202 connecting the adjacent folding portions 201. The folding portions 201 are arranged at the bottom of the bendable touch screen 12 and fixedly connected to the bendable touch screen 12. The connecting portion 202 is in a rotatable connection to the adjacent folding portions 201. In addition to the telescopic support frame 14 as described above, the foldable supporting frame 20 can also be used as the supporting frame. The common feature between the foldable supporting frame 20 and the telescopic supporting frame 14 lies in that both the foldable supporting frame 20 and the telescopic supporting frame 14 are in a retracted state in the first state and are in an expanded state in the second state. However, the foldable supporting frame 20 differs from the telescopic supporting frame 14 that the foldable supporting frame 20 is retracted and expanded in a folding form. The foldable supporting frame 20 includes the folding portions 201 and the connecting portion 202, where the connecting portion 202 is arranged between two adjacent folding portions 201 to connect the folding portions 201. The folding portions 201 are directly arranged at the bottom of the bendable touch screen 12 12 and drives the bendable touch screen 12 to switch between the first state and the second state. The folding portions 201 are disposed at the bottom of the bendable touch screen 12, and fixedly connected to the bottom of the bendable touch screen 12.

The folding portions 201 are in a rotatable connection to the connecting portion 202, such that the folding portions 201 and the connecting portion 202 can be foldable in the switching process between the first state and the second state, that is, the foldable supporting frame can be foldable. In some embodiments, the rotatable connection is a hinge connection.

In some embodiment, the connecting portion 202 includes at least two electromagnets which are connected with each other by a hinge, where the electromagnets have adjacent surfaces of different polarities while energized. In the second state, the electromagnets are energized and stick together to keep the folding portions 201 of the foldable supporting frame 20 expanded into a plane. The connecting portion 202 per se is consisted of the electromagnets connected by a hinge, which are characterized by being electromagnetic when energized and non-magnetic when not energized. In other words, when the electromagnets are energized, the adjacent electromagnets are attracted since the adjacent electromagnets have the adjacent surfaces of different polarities while energized, such that the connecting portion 202 that can be foldable previously by means of the hinge connection is turned into a whole. The connecting portion 202 which is not foldable cooperates with the folding portions 201 to render the expanded bendable touch screen 12 to be a flat screen.

In some embodiments, the connecting portion 202 may include at least one electromagnet and at least one ferromagnetic object which are connected with each other by a hinge. In the second state, the electromagnet is energized and thereby sticks with the ferromagnetic object to keep the folding portions 201 of the foldable supporting frame 20 expanded into a plane. Similar to the connecting portion 202 consisted of at least two electromagnets, the connecting portion 202 consisted of at least one electromagnet and at least one ferromagnetic object may be used. Since the electromagnet energized has ferromagnetism to attract the adjacent ferromagnetic object together, the connecting portion 202 is turned into a whole. The connecting portion 202 which is not foldable cooperates with the folding portions 201 to enable the expanded bendable touch screen 12 to maintain the flat form.

In some embodiments, the foldable terminal apparatus further includes transmission gear sets 21 which are respectively arranged at the bottom of the foldable supporting frame 20, and at positions on the terminal body 11 corresponding to the bottom of the foldable support frame 20 in the first state.

Fourth Exemplary Embodiment

In the embodiment is provided a terminal control method, which is applicable to the foldable terminal apparatus described in the foregoing embodiments. Referring to FIG. 11, the terminal control method includes steps S111 and S112.

At S111, a current state of a bendable touch screen of the terminal is acquired.

At S112, a content to be displayed is displayed according to the state of the bendable touch screen acquired.

The foldable terminal apparatus of the foregoing embodiments includes a bendable touch screen which may be switched between a first state and a second state. Accordingly, the bendable touch screen can perform different displays in correspondence to the first state and the second state.

In some embodiments, after acquiring the current state of the bendable touch screen of the terminal, the method further includes: switching the state of the bendable touch screen between the first state and the second state according to a trigger instruction. The trigger instruction may be a trigger instruction input by a user in real time, such as an instruction from the user operating a handle, or an instruction triggered by the user touching a corresponding UI on the touch screen.

The trigger instruction may also be a conditional instruction, such as a preset time or location. The switching can be triggered once the conditions such as arrival at a set time point, elapse of a set time period, and arrival at a set location are met.

In some embodiments, the step of displaying the content to be displayed according to the state of the bendable touch screen includes: when the current state of the bendable touch screen of the terminal is the first state, displaying the content to be displayed on at least part of the bendable touch screen. In the first state, due to the viewing angle, the user usually cannot view all the content displayed in full screen of the bendable touch screen, so that in this case, the user may selectively allow only a part of the bendable touch screen to display, while may allowing the other parts to selectively undergo operations such as black screen, screen-off and locking, or just display a desktop background, etc., thereby ensuring the user's operations on the terminal while avoiding excessive power consumption.

The step of displaying the content to be displayed according to the state of the bendable touch screen further includes: when the current state of the bendable touch screen of the terminal is the second state, displaying the content to be displayed in full screen on the bendable touch screen. When the bendable touch screen is in the second state, the free end extends out of the terminal body, so that at least part of the bendable touch screen is expanded into a plane. In this case, the user can view all the expanded portion of the bendable touch screen at the same time, e.g., the user can directly view the content in full screen on the expanded portion of the foldable touch screen. Here, the bendable touch screen in the second state may have two conditions: the bendable touch screen is fully expanded and the bendable touch screen is partially expanded. When fully expanded, the entire bendable touch screen is expanded into a plane, so that the user can view the entire bendable touch screen. When partially expanded, the non-expanded portion of the bendable touch screen still surrounds the terminal body, and thus, the content to be displayed on the bendable touch screen may be displayed only on the expanded portion, or displayed on both the extended portion and the non-expanded portion (the portion surrounds the terminal body).

In some embodiments, when the current state of the bendable touch screen of the terminal is the first state, the step of displaying the content to be displayed on at least part of the bendable touch screen includes: displaying the content to be displayed on at least part of the bendable touch screen according to a user's input. The user may decide how the content to be displayed is displayed on the bendable touch screen. Specifically, the user may input instructions through touch input, voice control, image recognition, etc. The input instructions include, but are not limited to, screen-off, screen locking, multi-screen synchronous display, split-screen display, etc. Based on different instructions, the bendable touch screen may perform distinguishing displays.

In some embodiments, when the terminal apparatus is shaped as a cuboid, the step of displaying the content to be displayed on at least part of the bendable touch screen includes: displaying the content to be displayed on at least one surface of the cuboid. Since the cuboid has four lateral side surfaces, and not all of the four side surfaces can be viewed by the user at the same time, the content to be displayed on the bendable touch screen can be selectively displayed on the four surfaces of the cuboid. For example, when a terminal desktop is displayed, necessary applications, such as phone calls and text messages, can be displayed on one surface, and common applications may be displayed on another surface. In the course of a phone call, only one of the four surfaces is selected for display, and the other surfaces are all black. In the case of some 3d applications, especially a game application developed based on stereoscopic 3d, all surfaces may be selected for display to achieve a realistic 3d effect.

Fifth Exemplary Embodiment

Figure 12:
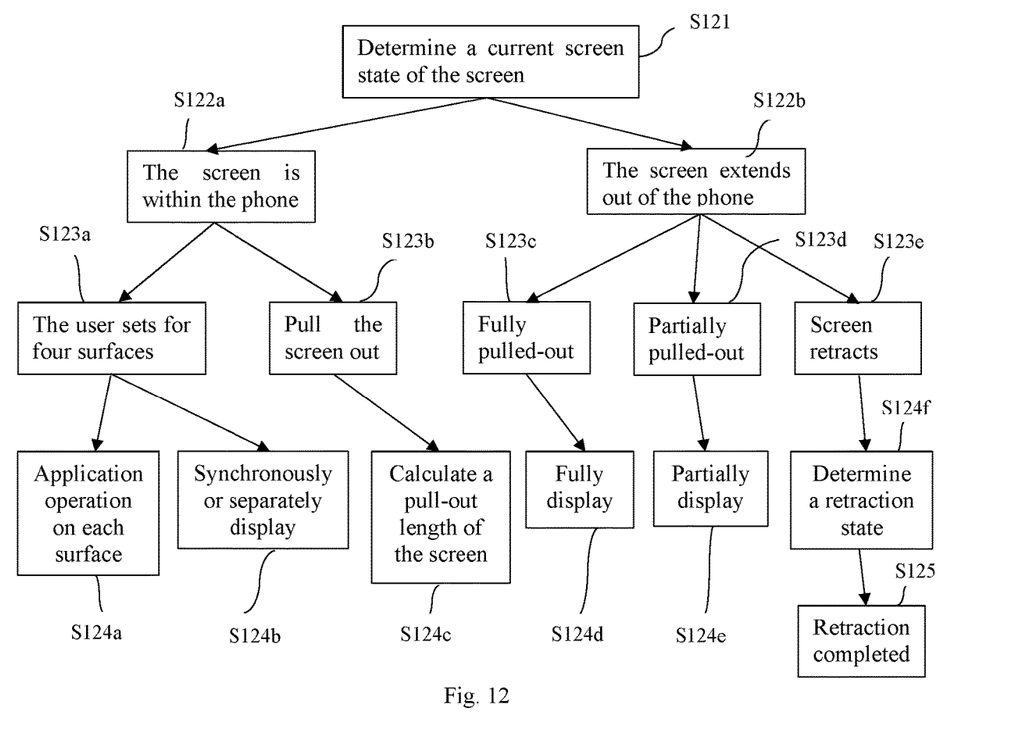
FIG. 12 is a flowchart of a terminal control method in a fifth embodiment of the present disclosure.

In the embodiment is provided a terminal control method, which is applicable to the foldable terminal apparatus described in the foregoing embodiments. With reference to FIG. 12, the terminal control method includes following steps S121 to S125.

At S121, a current screen state of the terminal apparatus is determined. The current screen state includes a first state, i.e., a folded state where the bendable touch screen surrounds a terminal body; and a second state, i.e., an expanded state where the bendable touch screen expands is expanded to the exterior of the terminal.

At S122a, the terminal is currently in the first state, that is, the bendable touch screen is located on an outer side of the terminal body.

At S123a, a user sets display and operation conditions of four surfaces of the bendable touch screen.

At 124a, the display conditions of four surfaces may the application operations on the four surfaces.

At S124b, the display conditions of four surfaces may include synchronous display, separate display, or partial display.

At S123b, the bendable touch screen in the first state is pulled out.

At S124c, a pull-out length of the bendable touch screen, that is, a length of the expanded portion of the bendable touch screen, is calculated.

At S122b, the terminal is in a second state, that is, the bendable touch screen is located outside the terminal body and expanded.

At S123c, the bendable touch screen is entirely pulled out of the terminal body.

At S124d, the content is displayed on the entire bendable touch screen.

At S123d, the bendable touch screen is partially pulled out of the terminal body.

At S124e, the content is displayed on the pulled-out portion of the bendable touch screen.

At S123e, the bendable touch screen is prepared to retract, that is, the bendable touch screen is switched from the second state to the first state.

At S124f, the retraction state of the foldable touch screen is determined, that is, whether the retraction is completed is determined.

At S125, the retraction is completed.

Sixth Exemplary Embodiment

Figure 13:
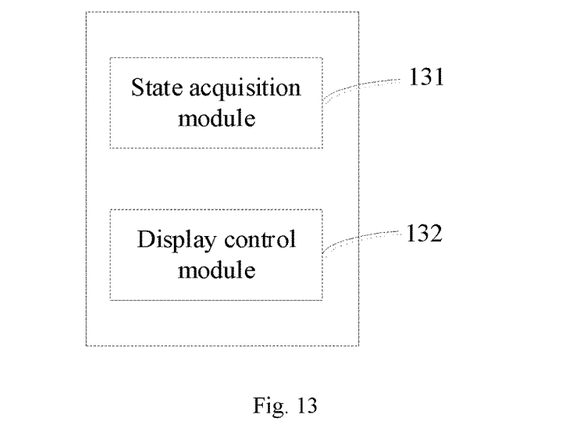
FIG. 13 is a schematic diagram of a terminal control device in a sixth embodiment of the present disclosure.

In this embodiment is provided a terminal control device, which is applicable to the foldable terminal apparatus in the abovementioned embodiments. Referring to FIG. 13, the terminal control device includes a state acquisition module 131 configured to acquire a current state of a bendable touch screen of the foldable terminal apparatus, and a display control module 132 configured to display a content to be displayed according to the state of the bendable touch screen acquired.

The foldable terminal apparatus of the embodiments described above includes a bendable touch screen which may be switched between a first state and a second state. Accordingly, the bendable touch screen can perform various displays in correspondence to the first state and the second state.

In some embodiments, the step of displaying the content to be displayed according to the state of the bendable touch screen includes: when the current state of the bendable touch screen of the terminal apparatus is the first state, displaying the content to be displayed on at least a part of the bendable touch screen. In the first state, due to the viewing angle, the user cannot view all the content displayed in full screen of the bendable touch screen, so that in this case, the user may selectively allow only a part of the bendable touch screen to display, while allowing the other parts to undergo operations such as black screen, screen-off and locking, or just display a desktop background, etc., thereby ensuring the user's operations on the terminal, while avoiding excessive power consumption.

The step of displaying the content to be displayed according to the state of the bendable touch screen further includes: when the current state of the bendable touch screen of the terminal is the second state, displaying the content to be displayed in full screen of the bendable touch screen. When the bendable touch screen is in the second state, the free end extends out of the terminal body, so that at least part of the bendable touch screen is expanded into a plane. In this case, the user can view all the expanded portion of the bendable touch screen. Here, the bendable touch screen in the second state may have two conditions: the bendable touch screen is fully expanded and the bendable touch screen is partially expanded. When fully expanded, the entire bendable touch screen is expanded into a plane, so that the user can view the entire bendable touch screen. When partially expanded, the non-expanded portion of the bendable touch screen still surrounds the terminal body, at this time the content to be displayed on the bendable touch screen may be displayed only on the expanded portion, or displayed on both the expanded portion and none-expanded portion (the portion surrounds the terminal body).

In some embodiments, when the current state of the bendable touch screen of the terminal is the first state, displaying the content to be displayed on at least part of the bendable touch screen includes: displaying the content to be displayed on at least part of the bendable touch screen according to a user's input. The user is allowed to control how the content is displayed on the bendable touch screen. Specifically, the user may input instructions through touch input, voice control, image recognition, etc. The input instructions include but are not limited to screen-off, screen locking, multi-screen synchronous display, split-screen display, etc. Based on different instructions, the bendable touch screen can perform distinguishing display.

In some embodiments, when the terminal apparatus has a cuboid shape, displaying the content to be displayed on at least part of the bendable touch screen includes: displaying the content to be displayed on at least one surface of the cuboid. Since the cuboid has four lateral side surfaces, and not all of the four lateral side surfaces can be seen by the user at the same time, the content to be displayed on the bendable touch screen can be selectively displayed on the four lateral side surfaces of the cuboid. For example, when a terminal desktop is displayed, necessary applications, such as phone calls and text messages, can be displayed on one surface, and common applications may be displayed on another surface. In the course of a phone call, only one of the four surfaces is selected for display, and the other surfaces are all in black. In the case of some 3d applications, especially a game application developed based on stereoscopic 3d, all surfaces may be selected for display to achieve a realistic 3d effect.

Seventh Exemplary Embodiment

Figure 14:
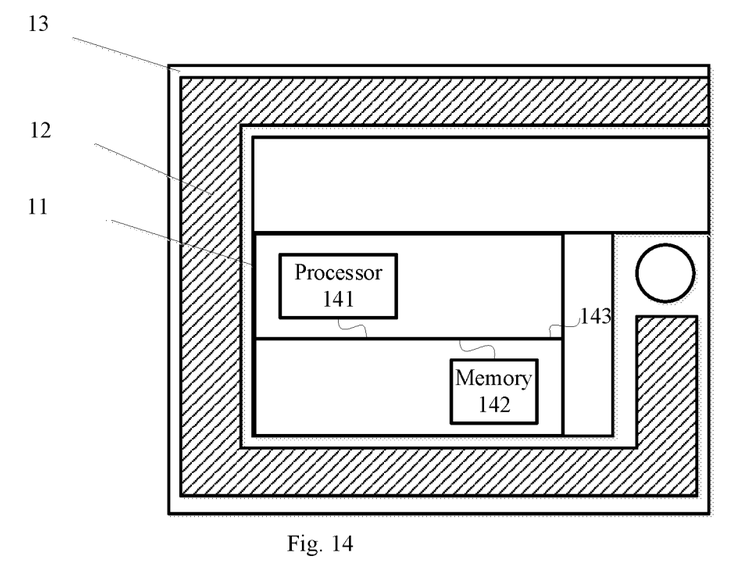
FIG. 14 is a schematic diagram of a terminal apparatus in a seventh embodiment of the present disclosure.

In this embodiment a terminal apparatus is further provided. As shown in FIG. 14, the terminal apparatus includes a terminal body 11 and a bendable touch screen 12. The terminal body 11 includes a processor 141, a memory 142 and a communication bus 143. The bendable touch screen in a bending direction has a fixed end connected to the terminal body and a free end, the fixed end. The bendable touch screen 12 is switched between a first state and a second state. In the first state, the bendable touch screen surrounds the terminal body 11 on an outer side of the terminal body. In the second state, the fixed end of the bendable touch screen is located on the terminal body, and the free end is located outside the terminal body, such that the bendable touch screen 12 is expanded. The communication bus 143 is configured to provide connection and communication between the processor 141 and the memory 142. The processor 141 is configured to execute one or more computer programs stored in the memory 142 to perform the steps of the terminal control method in the abovementioned embodiments, the steps will be not repeated here.

In the embodiments of the disclosure a non-transitory computer-readable storage medium is further provided. The computer-readable storage medium includes volatile and nonvolatile, removable and non-removable mediums implemented by any method or technology for storing the information, such as, computer readable instructions, data structures, program modules or other data. The computer-readable storage medium includes, but is not limited to a random access memory (RAM), a read-only memory (ROM), an erasable programmable read only memory (EPROM), a flash memory or other memory techniques; a compact disc read-only memory (CD-ROM), a digital video disk (DVD) or other optical storage; a tape cartridge, a magnetic tape, a disk storage or other magnetic storage devices; or any other medium that may be configured to store desired information and may be accessed by a computer.

The non-transitory computer-readable storage medium of the embodiments is configured to store one or more computer programs which are executable by a processor to implement at least one of the steps of the terminal control method in the abovementioned embodiments.

In the embodiments of the disclosure is further provided a computer program (or computer software). The computer program may be distributed on a computer-readable medium and executed by a computable device to implement at least one of the steps of the terminal control method in the above-mentioned embodiments.

In the embodiments of the disclosure is further provided a computer program product. The computer program product includes a computer readable device configured to store the above computer program. The computer-readable device of the embodiments may include the computer-readable storage medium.

It will be appreciated by those having ordinary skill in the art that, all or some of the steps, systems, functional modules/units of the methods disclosed above may be implemented as software (which may be implemented with computer program codes executable by a computing device), firmware, hardware, and any appropriate combinations thereof. In a hardware implementation, partitioning between functional modules/units mentioned in the above descriptions does not necessarily correspond to the partitioning of physical components. For example, a physical component may have multiple functions, or a function or step may be performed by several physical components in cooperation. Some or all of that physical components may be implemented as software execute by a processor, such as a central processor, digital signal processor or microprocessor, or as hardware, or as an integrated circuit, such as an application-specific integrated circuit.

Furthermore, as is well known to those having ordinary skill in the art, a communication medium typically contains computer-readable instructions, data structures, computer program modules, or other data in a modulated data signal such as a carrier wave or other transmission mechanism, and may include any information delivery medium. Therefore, the present disclosure is not limited to any particular combination of hardware and software.

The foregoing contents are further detailed descriptions of the embodiments of the present disclosure with reference to the accompanying drawings, it should be understood that the present disclosure is not limited to these descriptions. For those having ordinary skill in the art to which the present disclosure belongs, a number of simple deductions or substitutions may be made without departing from the concept of the present disclosure, all of which shall be regarded as falling within the scope of the present disclosure.

Industrial Applicability

In the embodiments of the present disclosure a foldable terminal apparatus, a terminal control method and device, a terminal apparatus and a non-transitory computer-readable storage medium are provided to solve the problems of lack of implementing means and poor user experience for the flexible screen terminal apparatus in existing technologies. A new foldable terminal apparatus is provided, of which the flexible touch screen is foldable in two different folding states. The flexible touch screen is sufficiently utilized for better user experience by designing the flexible touch screen to surround the terminal body in the first state and to expand in the second state by means of the bending property the flexible touch screen.

The invention claimed is:

1. A foldable terminal apparatus, comprising a terminal body and a bendable touch screen, the bendable touch screen in a bending direction having a fixed end connected to the terminal body and a free end, and the bendable touch screen being switched between a first state and a second state, wherein in the first state, the bendable touch screen surrounds the terminal body on an outer side of the terminal body, and in the second state, the fixed end of the bendable touch screen is located on the terminal body and the free end is located outside the terminal body, such that the bendable touch screen is expanded;

further comprising a supporting frame, wherein in the first state, the supporting frame is accommodated between the outer side of the terminal body and the bendable touch screen, and in the second state, the supporting frame expands into a plane and is located at a bottom of the bendable touch screen to support the bendable touch screen expanded into a plane, wherein the supporting frame is a telescopic supporting frame having one end fixedly connected to the terminal body;

further comprising at least two second inductive electromagnets arranged on a side of the telescopic supporting frame adjacent to the bendable touch screen, and first inductive electromagnets corresponding to the second inductive electromagnets, arranged at corresponding positions on the bottom of the bendable touch screen; wherein, in the second state, the first inductive electromagnets and the second inductive electromagnets are magnetically attracted together.

2. The foldable terminal apparatus of claim 1, further comprising a glass panel located on the outer side of the terminal body, wherein the glass panel is fixedly arranged on the terminal body and has a spacing from the terminal body greater than or equal to a thickness of the bendable touch screen.

3. The foldable terminal apparatus of claim 2, wherein the glass panel has a shape matching a side profile of the terminal body.

4. The foldable terminal apparatus of claim 1, further comprising third inductive electromagnets corresponding to the first inductive electromagnets, arranged on an outer surface of the terminal body; wherein, in the first state, the first inductive electromagnets and the third inductive electromagnets are magnetically attracted together.

5. The foldable terminal apparatus of claim 1, wherein the telescopic supporting frame comprises at least two connecting sections having radial dimensions decreasing or increasing progressively in a direction away from the terminal body in the second state; and every two adjacent connecting sections has matched inner and outer diameter dimensions.

6. The foldable terminal apparatus of claim 5, further comprising an inner and outer sliding gear set arranged between every two adjacent connecting sections of the telescopic supporting frame.

7. The foldable terminal apparatus of claim 1, wherein the supporting frame is a foldable supporting frame comprising at least two folding portions and a connecting portion connecting two adjacent folding portions, the folding portions are arranged at the bottom of the bendable touch screen and fixedly connected to the bendable touch screen, and the connecting portion is in a rotatable connection to the two adjacent folding portions.

8. The foldable terminal apparatus of claim 7, wherein the rotatable connection is a hinge connection.

9. The foldable terminal apparatus of claim 7, wherein the connecting portion comprises at least two electromagnets which are connected by a hinge, and the electromagnets have adjacent surfaces of different polarities after energized; and in the second state, the electromagnets are energized and attracted together to keep the folding portions of the foldable supporting frame expanded into a plane.

10. The foldable terminal apparatus of claim 7, wherein the connecting portion comprises at least one electromagnet and at least one ferromagnetic object which are connected by a hinge; and in the second state, the electromagnet is energized and attracted together with the ferromagnetic object to keep the folding portions of the foldable supporting frame expanded into a plane.

11. The foldable terminal apparatus of claim 7, further comprising transmission gear sets respectively arranged at the bottom of the foldable supporting frame and at a position on the terminal body corresponding to the bottom of the foldable support frame in the first state.

12. The foldable terminal apparatus of claim 1, wherein the terminal body is shaped as a cuboid or a cylinder.

* * * * *